April 12, 1966          J. R. RITTER          3,245,248
CRYOGENIC TEMPERATURE CONTROL APPARATUS
Filed Nov. 8, 1962
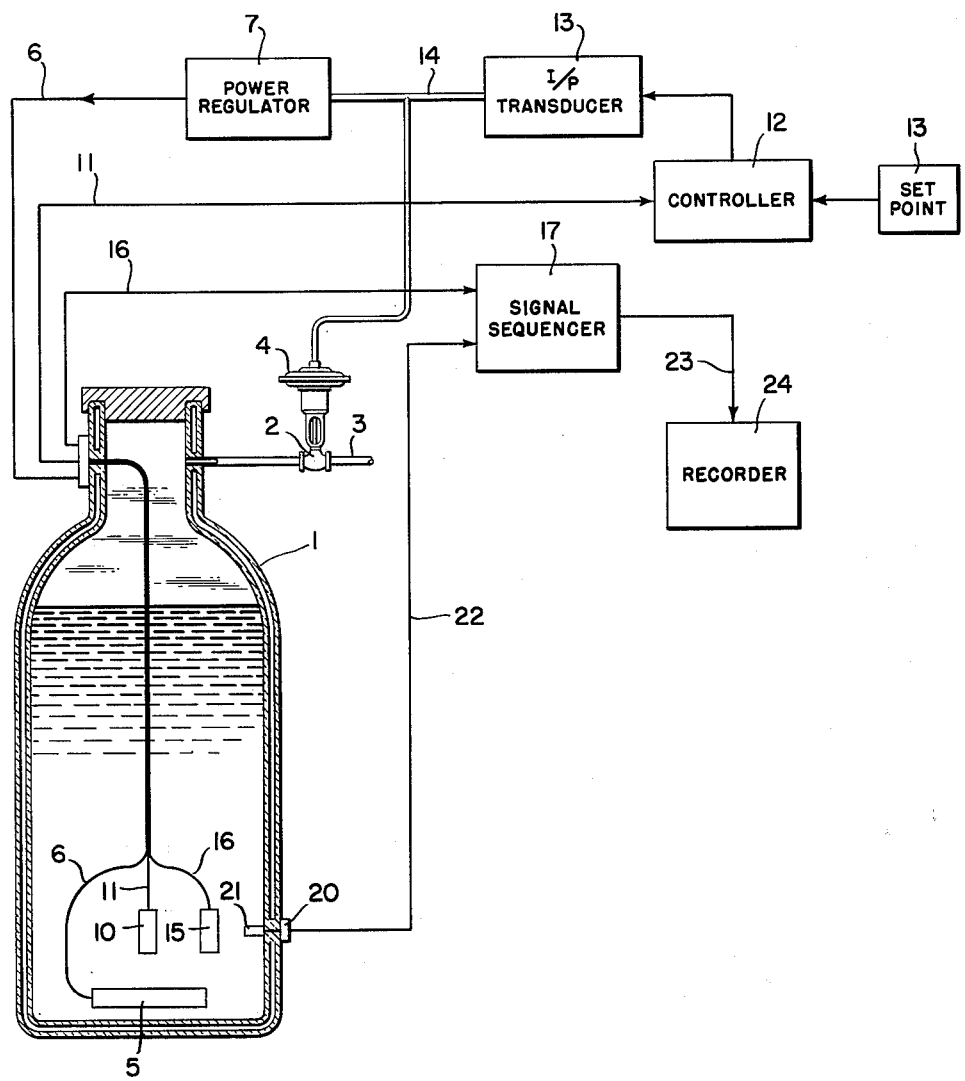
INVENTOR.
JOHN R. RITTER
BY *Arthur H. Swanson*
ATTORNEY.

3,245,248
CRYOGENIC TEMPERATURE CONTROL APPARATUS
John R. Ritter, Pottstown, Pa., assignor to Honeywell Inc., a corporation of Delaware
Filed Nov. 8, 1962, Ser. No. 236,293
6 Claims. (Cl. 73—1)

This invention pertains to measuring devices. More specifically, the present invention relates to thermometer calibration apparatus.

An object of the present invention is to provide an improved thermometer calibration apparatus including a cryogenic temperature control apparatus having particular utility for calibrating resistance thermometers.

A further object of the present invention is to provide an improved liquid temperature control apparatus utilizing the vapor pressure characteristic of a liquid bath.

A still further object of the present invention is to provide a cryogenic resistance thermometer calibration apparatus utilizing the vapor pressure characteristic of a cryogenic calibrating liquid bath.

Still another further object of the present invention is to provide an improved cryogenic temperature control apparatus, as set forth herein, which is characterized by a simplicity of operation and construction.

In accomplishing these and other objects, there has been provided, in accordance with the present invention, an improved temperature control apparatus for a cryogenic calibrating bath comprising a closed vessel for storing the cryogenic bath having a controlled vent valve. The vessel is also provided with a heating eleemnt in the liquid bath and a temperature probe for detecting the temperature of the cryogenic bath. The signal from the probe is compared by a controller with a temperature set-point signal. An output signal from the controller is used to control either the heating element or the venting of the vessel in order to follow the vapor pressure curve of the cryogenic bath. The vessel is provided with means for inserting sample thermometers into the cryogenic bath for calibration purposes.

A better understanding of the present invention may be had from the following detailed description when read in connection with the accompanying drawing, in which the single figure is a pictorial diagram of a cryogenic temperature control apparatus utilizing the present invention.

Referring to the single figure drawing, there is shown a Dewar flask 1 for storing a quantity of a liquified gas; e.g., liquid nitrogen. The Dewar flask 1 is vented by a pneumatically operated vent valve 2 through a pipe 3. The valve 2 is operated by a valve operator 4.

A heating element 5 is suspended within the liquid stored in the flask 1. A wire 6 is used to connect the heating element 5 to a power regulator 7 used to control the electrical power supplied to the heating element 5. A reference temperature probe 10 is positioned within the Dewar flask 1 to measure the temperature of the liquid bath. The probe 10 is connected by a wire 11 to a controller 12. The controller 12 may be any suitable device for comparing an input signal with a set-point signal and producing an error signal representative of the difference between the input signal and the set-point signal. The set-point signal is derived from a set-point device 13.

The error signal from the controller 12 is applied to a current-to-pressure transducer 13 for conversion to a corresponding pressure signal. The pressure signal is applied through pipe 14 to the valve operator 4 and power regulator 7 to control these devices in accordance therewith.

A temperature reference thermometer 15 is also positioned in the liquid within the Dewar flask 1 and is connected by a wire 16 to a signal sequencer 17. The signal sequencer 17 is arranged to sequentially connect an output line to each of a plurality of input lines. The Dewar flask 1 is provided with a housing means 20 for introducing a sample thermometer element 21 into the liquid bath in the Dewar flask 1 for calibration purposes. A line 22 is used to connect the sample thermometer 21 to the sequencer 17. The sequencer 17 is connected by an output line 23 to a recorder 24 for recording the readings of the thermometer 21 and thermometer 15.

In operation, the apparatus of the present invention is arranged to maintain the temperature of the liquid within the Dewar flask 1 at a constant temperature in order to allow an accurate calibration of the sample thermometer 21. The temperature of the liquid is maintained by following a vapor pressure curve for the particular liquid within the Dewar flask; e.g., liquid nitrogen. Since the temperature of the boiling point of liquid nitrogen is very low; i.e., −195.8 C., the addition of a small amount of heat by the heater 5 will cause the nitrogen to boil. This boiling action will increase the gas pressure on top of the liquid nitrogen within the sealed Dewar flask 1 and the boiling action will stabilize along the vapor pressure curve at a higher temperature of the liquid nitrogen.

Conversely, by venting the gas in the top of the Dewar flask 1 through the valve 2, the boiling point of the liquid nitrogen is lowered and the boiling action will stabilize at a lower temperature of the liquid nitrogen. Thus, the temperature of the liquid nitrogen may be adjusted by either energizing the heater 5 or operating the vent valve 2. The controller 12 is provided with a temperature set-point signal from the set-point unit 13 representative of a desired temperature of the liquid nitrogen bath. The controller 12 compares this set-point signal with a signal from the temperature probe 10 representative of the temperature of the liquid nitrogen. The controller 12 is effective to produce an output signal representative of the difference between the probe 10 signal and the set-point signal. Further, the controller output signal is arranged to be a signal band; e.g., 1 to 5 ma., with the center of the band representing an equality between the set-point signal and probe signal.

The output signal band from the controller 12 is converted by the transducer 13 into a corresponding pressure signal range; e.g., 0 to 18 p.s.i. This pressure signal is applied to the power regulator 7 and the valve operator 4. The regulator 7 and the operator 4 are arranged to respond to respective portions of the pressure signal band. For example, the power supplied to the heater 5 by the regulator 7 may be at a maximum level for an 18 p.s.i. signal and at a zero amplitude level at 9 p.s.i. Similarly, the operator 4 may respond so that the vent valve 2 is fully open for a 0 p.s.i. signal and fully closed for a 9 p.s.i. signal. It is to be noted that the relationship of the active ranges of the regulator 7 and operator 4 may be arranged differently from the aforesaid example to produce optimum control of the temperature of the liquid nitrogen. Accordingly, the controller 12 is effective to control the liquid nitrogen bath temperature by controlling either the heating element 5 or the valve 2 to follow the vapor-pressure curve of the liquid nitrogen.

The sequencer 17 is effective to provide an alternate read-out of the thermometer 15 and the sample thermometer 21. This read-out operation is applied to the recorder 24 to provide a record of the sample thermomenter reading and the thermometer reading to calibrate the sample thermometer 21.

Thus, it may be seen that there has been provided, in accordance with the present invention, a cryogenic temperature control apparatus for calibrating cryogenic thermometers utilizing the vapor pressure characteristic of a calibrating liquid bath.

What is claimed is:

1. A cryogenic temperature control apparatus for providing a constant temperature cryogenic liquid bath comprising a closed vessel for storing a cryogenic liquid, a valve operative to vent said tank, heater means operative to heat the cryogenic liquid stored in said vessel, temperature detecting means operative to detect the temperature of the cryogenic liquid, and temperature control means responsive to said temperature detecting means for controlling said heater means in one range of operation of said controller means and said valve in another range of operation of said controller means whereby to follow the vapor-pressure curve of said cryogenic liquid.

2. A cryogenic temperature control apparatus as set forth in claim 1 wherein said controller means includes controller means for comparing a set-point signal with a signal from said temperature detecting means to produce a representative output signal, heater control means operative to control the power supplied to said heater means, and valve operator means operative to control said valve, said heater control means and said valve operator means responding to corresponding portions of said output signal from said comparator means.

3. A cryogenic temperature control apparatus as set forth in claim 1 wherein said cryogenic liquid has a boiling point at a temperature greatly below normal atmospheric conditions.

4. A cryogenic temperature control apparatus as set forth in claim 3 wherein said cryogenic liquid is liquid oxygen.

5. A cryogenic temperature control apparatus as set forth in claim 2 wherein said closed vessel includes means operative to introduce signal-producing temperature measuring devices into said cryogenic liquid for purposes of calibration of the signals from said measuring devices.

6. A cryogenic temperature control apparatus as set forth in claim 5 which includes a signal sequencer operative to individually and sequentially select ones of said measuring devices for connection to a common output line and a recording means connected to said common output line for recording the signals from said measuring devices.

References Cited by the Examiner

UNITED STATES PATENTS

| 1,304,100 | 5/1919 | Roesch | 236—99 |
| 2,015,838 | 10/1935 | Bordon et al. | |
| 2,489,049 | 11/1949 | Root | 165—26 X |
| 2,515,835 | 7/1950 | Preston | 62—50 X |
| 2,856,944 | 10/1958 | Morrison. | |
| 2,948,295 | 8/1960 | Smith. | |
| 3,068,387 | 12/1962 | Koppel. | |
| 3,080,725 | 3/1963 | Cowley et al. | 62—514 X |
| 3,092,977 | 6/1963 | Skinner | 62—217 X |

FOREIGN PATENTS 709,445   5/1931   France.

OTHER REFERENCES

Review of Scientific Instruments, vol. 31, by Flournoy et al., 1960, pages 1133–1135.

Technical News Bulletin, N.B.S., March 1961, pages 44–48.

ALDEN D. STEWART, *Primary Examiner*.

WILLIAM F. D'DEA, *Examiner*.